(12) United States Patent
Jobmann et al.

(10) Patent No.: US 7,947,370 B2
(45) Date of Patent: May 24, 2011

(54) MICROCAPSULES USED FOR PRODUCING RUBBER AND METHOD FOR THEIR PRODUCTION

(75) Inventors: Monika Jobmann, Buxtehuder (DE); Gerald Rafler, Potsdam (DE); Jozef Sagala, Böblingen (DE); Ingeborg Gross, Stuttgart (DE)

(73) Assignee: Schill + Seilacher GmbH, Boblingen (DE)

( * ) Notice: Subject to any disclaimer, the term of this patent is extended or adjusted under 35 U.S.C. 154(b) by 1064 days.

(21) Appl. No.: 10/527,350

(22) PCT Filed: Sep. 4, 2003

(86) PCT No.: PCT/EP03/09825
§ 371 (c)(1),
(2), (4) Date: Jan. 9, 2006

(87) PCT Pub. No.: WO2004/024313
PCT Pub. Date: Mar. 25, 2004

(65) Prior Publication Data
US 2006/0127668 A1    Jun. 15, 2006

(30) Foreign Application Priority Data

Sep. 10, 2002    (DE) .................................. 102 41 942

(51) Int. Cl.
  *B32B 25/04*    (2006.01)
  *B01J 13/02*    (2006.01)
(52) U.S. Cl. ........... 428/402.2; 428/402.21; 428/402.24; 428/403; 428/407; 427/213.3; 427/213.31; 264/4; 264/4.3; 264/4.32
(58) Field of Classification Search ..... 428/402–402.24, 428/403; 427/213.3–213.36; 264/4–4.7
See application file for complete search history.

(56) References Cited

U.S. PATENT DOCUMENTS

| | | | |
|---|---|---|---|
| 2,623,079 A | 12/1952 | Johnson | |
| 4,092,285 A | 5/1978 | Leo et al. | |
| 4,356,109 A | 10/1982 | Saeki et al. | |
| 4,396,670 A | 8/1983 | Sinclair | |
| 4,528,354 A | 7/1985 | McDougal | |
| 4,670,344 A * | 6/1987 | Okada et al. | 428/402.21 |
| 6,187,439 B1 | 2/2001 | Elwakil | |
| 2002/0065148 A1 | 5/2002 | Yokota et al. | |
| 2003/0165682 A1 | 9/2003 | Menting et al. | |
| 2006/0127668 A1 | 6/2006 | Jobmann et al. | |
| 2008/0227888 A1 | 9/2008 | Jobmann et al. | |

FOREIGN PATENT DOCUMENTS

| | | |
|---|---|---|
| CH | 564 370 A | 7/1975 |
| DE | 31 14035 C2 | 2/1982 |
| DE | 40 13 005 A1 | 10/1991 |
| DE | 197 27 848 A1 | 1/1999 |
| DE | 197 54 341 A1 | 7/1999 |
| DE | 197 54 342 A1 | 8/1999 |
| DE | 199 23 202 B4 | 11/2000 |
| DE | 102 41 942 A1 | 3/2004 |
| EP | 0 653 444 A2 | 5/1995 |
| EP | 1 118 382 B1 | 4/2003 |
| FR | 2 603 273 A1 | 3/1988 |
| JP | 52-069455 A | 6/1977 |
| JP | 2002226635 A | 8/2002 |
| KR | 2001-0032468 | 4/2001 |
| WO | WO 93/23795 A1 | 11/1993 |
| WO | WO 99/27012 A1 | 6/1999 |
| WO | WO 99/27013 A1 | 6/1999 |
| WO | WO 2004/024313 A1 | 3/2004 |
| WO | WO 2007/012495 A1 | 2/2007 |

OTHER PUBLICATIONS

Finch et al., "Microencapsulation," in *Ullmann's Encyclopedia of Industrial Chemistry* (2001, electronic release).
Jobmann et al., "Controlled release systems of biodegradable polymers. 6th Communication: Control of particle size and size distribution of microparticles produced by the solvent evaporation technique," *Pharm. Ind.*, 60, 11, 979-982 (1998).
Office Action issued Nov. 26, 2009 in copending Japanese Application No. 2004-535429.
Sugawara, "Bloom Stabilised Rubber Composition Contain Sulphur Microencapsulation Thermoplastic Resin," Database WPI Week 197729, Derwent Publications Ltd., London, GB, Date: Jun. 9, 1977.
International Search Report dated Oct. 13, 2006 for PCT/EP2006/007499.

\* cited by examiner

*Primary Examiner* — James Seidleck
*Assistant Examiner* — Saira Haider
(74) *Attorney, Agent, or Firm* — Leydig, Voit & Mayer, Ltd.

(57) ABSTRACT

The invention relates to microcapsules made of a core which contains at least one rubber additive and of a shell made of a first polymer.

At least one coating made of a second polymer, which differs from the first polymer, and/or of a low molecular inorganic or organic compound, is deposited on the surface of the microcapsules as sliding or wearing layer in order to reduce the static friction.

19 Claims, No Drawings

MICROCAPSULES USED FOR PRODUCING RUBBER AND METHOD FOR THEIR PRODUCTION

This application is the U.S. national phase of international patent application PCT/EP03/009825, filed on Sep. 4, 2003, and claims priority to German patent application number 102 41 942.6, filed Sep. 10, 2002, all of which are hereby incorporated by reference.

The invention relates to sulphur-containing microcapsules which release sulphur rapidly at temperatures above 150° C., and a method for producing these microcapsules with non-meltable polymer wall materials made of a reactive resin and an additional layer in order to improve the lubricity in highly viscous and highly abrasive polymer mixtures or for controlled removal with a particle size of 1-30 μm. Particle geometry and morphology can be adjusted specifically via polymer-specific (network density, polymer structure) and/or technological parameters of particle formation (particle size of the sulphur to be encapsulated, shearing when using liquid sulphur, reaction conditions for the wall formation). Sulphur-containing microcapsules with a particle wall of a complex construction are usable above all for optimised rubber vulcanisation since they are stable under production and storage conditions of these rubber mixtures.

Preferably sulphur is used to cross-link synthetic (diene rubbers) and natural rubbers. Before hot vulcanisation, the sulphur together with fillers and further additives must be well incorporated into the masticated rubber mixture, i.e. mechanically and thermally decomposed rubbers, at temperatures up to 110° C. At temperatures from 100° C., sulphur is readily soluble in the rubber mixture. During cooling of the mixture, undesired heterogenisation of the system is however effected due to crystallisation of the sulphur which leads to vulcanisation problems. Storage of the rubber mixture at higher temperatures in order to avoid crystallising-out leads to premature cross-linking and lowering of the product quality in the rubber products.

The temporal and/or local availability of reactive or non-reactive additives for plastic materials e.g. thermoplasts, elastomers, duromers, can be controlled efficiently by covering or embedding in straight-chain or network-forming polymers. Polymer-based microcomposites of this type are known in the form of microcapsules with a core-shell structure or in the form of microscale matrix particles with an extensively homogeneous distribution of the components over the particle cross-section (Ch. A. Finch, R. Bodmeier: "Microencapsulation" in Ullmann's Encyclopedia of Industrial Chemistry, $6^{th}$ Ed. 2001 Electronic Release). The core of microcapsules can be present in solid, liquid or gaseous form (hollow balls). In the case of matrix particles, homogeneous- and heterogeneous-phase systems are known.

Methods for producing polymer-based microparticles by means of reactive and non-reactive particle formation processes have been described many times. In the case of reactive particle formation, the formation of the wall or of the matrix is effected in parallel with a polymerisation, polycondensation or polyaddition process, In the case of non-reactive methods, film-forming polymers are used directly, which are brought by a thermodynamic route to phase separation and to particle formation (M. Jobmann, G. Rafler: Pharm. Ind. 60 (1998) 979).

For reactive methods for encapsulation of solid or liquid core materials, melamine formaldehyde resins are used very frequently (DE 199 23 202) but isocyanate/amine systems are also described. Melamine formaldehyde resins can be used for covering hydrophobic core materials in various ways and without difficulty, and they can be applied for particle formation from the aqueous phase. Reactive methods require core materials which are inert relative to the wall- or matrix-forming monomers or oligomers, i.e., they do not react with other components which are involved. Apart from the melamine formaldehyde resins, long reaction times of up to 24 h are frequently required with these reactive methods. The microcapsule size can be between 10 and 150 μm dependent upon the reaction conditions, e.g. emulsion addition or dispersion method. For a monomer concentration below 10% by mass and when using high-shearing dispersion tools, sizes around 1 μm can also be achieved (EP 0 653 444).

In the case of non-reactive methods, a polymer is converted from solution into a particulate form by dispersion, dropping or spraying processes or via methods which are based on the principle of liquid-liquid phase separation. Dispersion, dropping and spraying methods comprise solvent evaporation, phase separation methods on the other hand are based on the principle of precipitation of the wall material, e.g. by addition of an incompatible component to the polymer solution. What is decisive for the selection of a capsule method is the solubility of the polymer wall or matrix material in an organic solvent and also the compatibility with this solvent of the active ingredient to be encapsulated or embedded.

The range of polymer-based microcomposites, which can be found commercially or in market preparation, in the form of microcapsules or microscale matrix particles, in addition to the "classical" applications in the case of carbon papers, is dominated above all by products of the life sciences sector. There are protective or release systems for active ingredients of the pharmaceutical, cosmetic and agrochemical industry or food and animal feed additives, which are optimised in their processing and application behaviour by means of microencapsulation.

The properties of microscale two- or multi-component systems should however be used in various ways also in the material field, preferably in process and material optimisation. Fields of use of this type are for example the controlled release of reaction components, catalysts, initiators and stabilisers, the simplification of metering, mixing and separating processes or the improvement of the compatibility of plastic material additives. A precondition for the use of polymer-based microcapsules or matrix particles for process and/or material optimisation is their thermal, mechanical and media stability under the respective technological process or conditions of use typical for the material and also the possibility of a controllable release of the covered or embedded substances, such as reactive components, catalysts, stabilisers, etc. For use in vulcanisable elastomers, the temporary stability of the microcapsules or material matrix under formulation conditions in kneaders, calenders or twin-screw extruders at temperatures up to 120° C. and high shearing loads and also their destruction with rapid sulphur release under hot vulcanisation conditions at above 150° C. is an indispensible precondition.

In DE 197 54 342, sulphur particles covered with various polymer or wax materials are described, said sulphur particles releasing sulphur by melting or dissolving the capsule wall in the rubber mixture at temperatures of 120-140° C. Below the melting temperature of the capsule wall, the capsules are intended to be stable. The small temperature differences between stability and melting or dissolving of the capsule wall are technologically extremely difficult to control in the rubber process as a result of uncontrolled heating due to friction when mixing the highly viscose mixtures. A vulcanisation method using sulphur, which is encapsulated in a stable form under mastication conditions, and release by melting or dissolution of the capsule wall at the only slightly higher temperatures of hot vulcanisation cannot be achieved as a result of parameter variation being too small.

Straight-chain, thermoplastically deformable polymers or waxes can be applied in general for the microencapsulation of process aids, reaction components or property-modifying additives only in a limited manner since, under compounding and processing conditions of normal polymer materials, they are deformed, dissolved or destroyed. The required melting point differences of at least 40-50° C. can only rarely be achieved for very low softening polymers. In principle, in fact temperature-resistant polymers, such as polyaramides (poly-m-phenylene isopthalamide, poly-p-phenylene terephthalamide), polyacrylnitrile, polysulfones, polyether ketones etc., are available for the non-reactive encapsulation of process aids or material additives but they have not been able to be used to date or only in a very restricted manner for microencapsulation since—except for poly-m-phenylene isophthalamide and polyacrylnitrile—they have significant solubility problems in the organic solvents which are introduced as a result of their structure.

The object therefore underlying the invention is to produce microencapsulated sulphur with high mechanical stability under mastication conditions and with a wall material which can be destroyed in a controlled manner in the vulcanisation step according to an efficient method.

This object preferably is achieved by the characterizing features of the present invention. Advantageous embodiments and further developments of the solution will be apparent from the description of the invention provided herein.

According to the invention, microcapsules made of a core which contains at least one rubber additive and of at least one shell made of a first polymer are provided. At least one coating made of a second polymer, which differs from the first polymer, and/or of a low molecular inorganic or organic compound, is thereby deposited on the surface of the microcapsules as sliding or wearing layer in order to reduce the static friction.

The sulphur encapsulated with a polymer comprises a microscale particle, the shell of which is constructed from a polymer which cannot melt under mastication conditions and also from at least one additional coating in order to lower the static friction or from a second or further shell which can be decomposed in a controlled mechanical manner during incorporation into the rubber mixture.

Preferably, the shell or shells made of the first polymer are mechanically stable under mastication conditions and thermally stable up to at least 120° C., preferably up to 140° C. The first polymer can also be applied in the form of at least two shells in order to improve stabilisation. In this case, at least one second shell made of the first polymer is applied after encapsulation of the rubber additive with the first polymer, if necessary after trimming.

The rubber additive can thereby be released in a controlled manner under vulcanisation conditions, i.e. at temperature conditions around approximately 150° C.

Ground or liquid sulphur are used preferably as rubber additives. The sulphur proportion of the microcapsules is thereby preferably more than 70% by weight, particularly preferred between 80 and 95% by weight.

The first polymer used according to the invention in order to form the at least one shell is preferably a reactive resin which is selected from the group of amino resins, such as dicyandiamide formaldehyde resin or melamine formaldehyde resin or phenol formaldehyde resin. The second polymer, which is used for the coating of the microcapsules, which is adhesion-lowering or can be decomposed in a controlled manner, is a polymer which differs structurally from the first polmer and preferably is a straight-chain polymer. The second polymer is thereby preferably selected from the group of polyacrylates, polyacrylnitriles, polyethyleneglycols, ethylcelluloses, starch fatty acid esters and starch carbamates of long-chain isocyanates.

Another alternative for the coating resides in using low molecular organic or inorganic substances, such as e.g. waxes, fatty acid derivatives, polysaccharides, silicones, siloxanes or silicates.

Particle geometry and also particle size and its distribution are a function of the sulphur core. The average particle size is preferably between 1 and 30 μm, particularly preferred between 5 and 20 μm. For ground sulphur, the particle parameters are prescribed by geometry, size and distribution of the powder. In the case of encapsulation of liquid sulphur, the particle parameters are a function of the dispersion of the liquid sulphur in the aqueous or organic solution of the first polymer. In order to avoid agglomeration in the capsule core, the configuration of the shell can be implemented in addition with ultrasound treatment.

The thickness of the shell or shells is preferably between 30 and 100 nm. The thickness of the shell and of the coating taken together is preferably between 40 and 200 nm.

According to the invention, a method is likewise provided for producing microcapsules made of a core which contains at least one rubber additive, of at least one shell made of a first polymer and of at least one sliding or wearing layer with the following steps:

a) Firstly the rubber additive is dispersed in a prepolymer solution forming a first polymer.
b) The microcapsules are cured by the addition of a catalyst and/or by increasing the temperature.
c) Subsequently, the sliding or wearing layer made of a second polymer, which differs from the first polymer, and/or of a low molecular inorganic or organic compound is deposited on the surface of the microcapsules.

The application of the first polymer on the rubber additive can thereby be implemented as a batch process, quasi-continuously or also continuously in known reactors and with known agitation and dispersion techniques for encapsulation processes. In order to improve stabilisation, the first polymer can also be applied in the form of at least two shells. In this case, it is convenient to implement a thermal or chemical curing after encapsulation of the additive with the first polymer and then to apply a second shell onto the encapsulated additive. The deposition of the sliding or wearing layer can be deposited using a second polymer by means of analogous equipment.

For encapsulation with the first polymer, preferably ground or liquid sulphur is used as rubber additive. The application of the sliding or wearing layer is effected using the second polymer in step c) dependent upon the polymer structure according to known methods of non-reactive encapsulation, preferably by coacervation, solvent evaporation, salting-out or spray-drying. Low molecular coating agents are applied preferably from an organic solution or aqueous dispersion. Preferably, separation of the sulphur-containing microcapsules from the prepolymer solution is effected before application of the sliding or wearing layer. However, direct further processing is also possible, preferably when spraying processes can be applied.

The sliding or wearing layer can be deposited preferably by spraying processes.

Microparticles produced according to the invention can be granulated after application of the sliding or wearing layer by the addition of known granulating aids or also by means of the second polymer used for the coating or by means of the low molecular inorganic or organic compound.

The microparticles according to the invention can be used in synthetic or natural rubber in the spray-dried or vacuum-dried form. Filter-dried microcapsules with a residual moisture content of 2%, as are obtained after separation from organic coating agent solution, can be used directly.

Initial information with respect to the encapsulation efficiency and the density of the wall is obtained from blacking tests with sulphur products on copper foils and also by extraction tests with carbon disulphide.

In Table 1, the density and stability of sulphur-containing microcapsules based on ground sulphur as starter material is represented.

| Material | Blacking Cu foil [h] | Maximum extractable sulphur [%] |
|---|---|---|
| Ground sulphur, unencapsulated | immediate | 100 |
| Ground sulphur, single wall made of M/F resins | 2 | 3.5 |
| Ground sulphur, double wall made of M/F resins | 8 | 0.1 |
| Ground sulphur oiled, double wall made of M/F resins | 8 | 0.1 |
| Ground sulphur, double wall made of M/F resins, thermal postcuring | 20 | 0.1 |
| Ground sulphur, double wall made of M/F resins, chemical postcuring | 24 | 0.1 |
| Ground sulphur, double wall made of M/F resins with stearate coating | 24 | 1.7 |
| Ground sulphur, double wall made of M/F resins with paraffin wax coating | 24 | 2.3 |
| Ground sulphur, double wall made of M/F resins with acrylate coating | 26 | 1.3 |
| Ground sulphur, double wall made of M/F resins with ethylcellulose coating | 22 | 0.8 |
| Ground sulphur, double wall made of M/F resins, thermal postcuring, stearate coating | 32 | 0.2 |

In Table 2, the density and stability of sulphur-containing microcapsules based on liquid sulphur as starter material is represented.

| Material | Blacking Cu foil [h] | Maximum extractable sulphur [%] |
|---|---|---|
| Sulphur, single wall made of M/F resins | 3 | 4.3 |
| Sulphur, double wall made of M/F resins | 12 | 0.3 |
| Sulphur, double wall made of M/F resins with stearate coating | 24 | 0.2 |
| Sulphur, double wall made of M/F resins with paraffin wax coating | 24 | 1.2 |
| Sulphur, double wall made of M/F with acrylate coating | 12 | 2.1 |
| Sulphur, double wall made of M/F resins with ethylcellulose coating | 36 | not detectable |
| Sulphur, double wall made of M/F resins, thermal postcuring, stearate coating | 36 | not detectable |
| Sulphur, double wall made of M/F resins, chemical postcuring, stearate coating | 38 | 0.1 |

The invention is explained with reference to the following examples, without these being restricted to the embodiments.

EXAMPLE 1

Mono-layer Capsule Wall Made of Melamine Formaldehyde Resin

In an agitated tank, 96 g finely ground sulphur, 28 g melamine formaldehyde resin (M/F resin) of the PIAMID M 50 type and 16.8 g citric acid are intensively intermixed in 480 ml water with a high performance agitation and dispersion apparatus (ULTRA-TURRAX) at 60° C. The wall formation is terminated after 10 min. For curing, postcondensation takes place for another 120 min with agitation in a low-shearing agitator. The capsules are separated and tested in the filter-moist state for sulphur release and stability in the rubber mixture.

Yield, microencapsulated sulphur, filter-moist: 115 g
Extractable sulphur: 3.5%
Stability after rubber incorporation: 120 h

EXAMPLE 2

Double Wall

Dispersion apparatus (ULTRA-TURRAX), intensive interning at 60° C. The wall formation is terminated after 10 min. For curing, postcondensation takes place for another 120 min with agitation in a low-shearing agitator. The microcomposites are separated and encapsulated a second time in an analogous manner with 28 g M/F resin in the presence of 16.8 g citric acid in 480 ml water. The capsules are separated and tested in the filter-moist state for sulphur release and stability in the rubber mixture (as described in Example 1).

Yield, microencapsulated sulphur, filter-moist: 120 g
Extractable sulphur: 0.1%
Stability after rubber incorporation: 168 h

EXAMPLE 3

Double Wall

In an agitated tank, 96 g finely ground sulphur, 28 g Melamine formaldehyde resin of the PIAMID M 50 type and 16.0 g isophthalic acid are intensively intermixed in 480 ml water with a high performance agitation and dispersion apparatus (ULTRA-TURRAX) at 60° C. The wall formation is terminated after 10 min. For curing, postcondensation takes place for another 120 min with agitation in a low-shearing agitator. The microcomposites are separated and encapsulated a second time in an analogous manner with 28 g M/F resin in the presence of 16.0 g isophthalic acid in 480 ml water. The capsules are separated and tested in the filter-moist state for sulphur release and stability in the rubber mixture (as described in Example 1).

Yield, microencapsulated sulphur, filter-moist: 120 g
Extractable sulphur: 0.1%
Stability after rubber incorporation: 275 h

EXAMPLE 4

Double Wall, Thermal Postcure

In an agitated tank, 96 g finely ground sulphur, 28 g melamine formaldehyde resin of the PIAMID M 50 type and 16.8 g citric acid are intensively intermixed in 480 ml water with a high performance agitation and dispersion apparatus (ULTRA-TURRAX) at 60° C. The wall formation is terminated after 10 min. For curing, postcondensation takes place for another 120 min with agitation in a low-shearing agitator.

The microcomposites are separated and encapsulated a second time in an analogous manner with 28 g M/F resin in the presence of 16.8 g citric acid in 480 ml water.

The capsules are separated, postcured for 6 h at 110° C. and tested for sulphur release and stability in the rubber mixture (as described in Example 1).

Yield, microencapsulated sulphur: 110 g
Extractable sulphur: 0.1%
Stability after rubber incorporation: 360 h

EXAMPLE 5

Double Wall, Chemical Postcure

In an agitated tank, 96 g finely ground sulphur, 28 g melamine formaldehyde resin of the PIAMID M 50 type and 16.8 g citric acid are intensively intermixed in 480 ml water with a high performance agitation and dispersion apparatus (ULTRA-TURRAX) at 60° C. The wall formation is terminated after 10 min. For curing, postcondensation takes place for another 120 mil with agitation in a low-shearing agitator.

The microcomposites are separated and encapsulated a second time in an analogous manner with 28 g M/F resin in the presence of 16.8 g citric acid in 480 ml water.

The capsules are separated, postcured in 0.1 m amidosulphuric acid at 60° C. for 1 h and tested for sulphur release and stability in the rubber mixture (as described in Example 1).

Yield, microencapsulated sulphur, filter-moist: 120 g
Extractable sulphur: 0.1%
Stability after rubber incorporation: 350 h

EXAMPLE 6

Double Wall 100 g sulphur are melted at 130° C. and the melt rapidly supplied to a microencapsulation batch, comprising 28 g melamine formaldehyde resin of the PIAMID M 50 type and 12.0 g isophthalic acid and 480 ml water and intensively intermixed with a high performance agitation and dispersion apparatus (ULTRA-TURRAX) at 90° C. The wall formation around the finely distributed sulphur particles is terminated after 4 min. For curing, postcondensation takes place for another 120 min with agitation in a low-shearing agitator, The microcomposites are separated and encapsulated a second time in an analogous manner with 28 g M/F resin in the presence of 16.0 g isophthalic acid in 480 ml water. The capsules are separated and tested in the filter-moist state for sulphur release and stability in the rubber mixture (as described in Example 1).

Yield, microencapsulated sulphur, filter-moist: 125 g
Extractable sulphur: not detectable
Stability after rubber incorporation: 336 h

EXAMPLE 7

Double Wall 100 g sulphur are melted at 130° C. and the melt rapidly supplied to a microencapsulation batch, comprising 28 g melamine formaldehyde resin of the PIAMID M 50 type and 12.0 g isophthalic acid and 480 ml water and intensively intermixed with a high performance agitation and dispersion apparatus (ULTRA-TURRAX) at 90° C. The wall formation around the finely distributed sulphur particles is terminated after 4 min. For curing, postcondensation takes place for another 120 min with agitation in a low-shearing agitator.

The microcomposites are separated and encapsulated a second time in an analogous manner with 28 g M/F resin in the presence of 16.0 g isophthalic acid in 480 ml water.

The capsules are separated and tested in the filter-moist state for sulphur release and stability in the rubber mixture (as described in Example 1).

Yield, microencapsulated sulphur, filter-moist: 125 g
Extractable sulphur: not detectable
Stability after rubber incorporation: 396 h

EXAMPLE 8

Complex Capsule Wall Comprising a Double Casing and Sliding Layer 100 g filter-moist microcomposites with M/F resin double wall, produced analogously to Example 2, 3 or 4, are coated with 20 g paraffin wax dissolved in 0.5 l benzene at 70° C. The coated microcomposites are separated at the coating temperature and air-dried.

Yield, coated microencapsulated sulphur, air-dried: 104 g
Extractable sulphur: 1.2%
Stability after rubber incorporation: 336 h

EXAMPLE 9

Complex Capsule Wall Comprising a Double Casing and Sliding Layer 100 g filter-moist microcomposites with M/F resin double wall, produced analogously to Example 2, 3 or 4, are coated with 20 g calcium stearate dissolved in 0.5 l toluene at 90° C. The coated microcomposites are separated at the coating temperature and air-dried.

Yield, coated microencapsulated sulphur, air-dried: 106 g
Extractable sulphur: not detectable
Stability after rubber incorporation: 336 h

EXAMPLE 10

Complex Capsule Wall Comprising a Double Casing and Sliding Layer 300 g filter-moist microcomposites with M/F resin double wall, produced analogously to Example 2, 3 or 4, are coated with 45 g polyacrylate of the DEGALAN® type, dissolved in 0.5 l acetone, in a spray coater of the GLATT type.

Yield, coated microencapsulated sulphur, air-dried: 310 g
Extractable sulphur: 0.8%
Stability after rubber incorporation: 336 h

EXAMPLE 11

Complex Capsule Wall Comprising a Double Casing and Sliding Layer 300 g of filter-moist microcomposites with M/F resin double wall, produced analogously to Example 2, 3 or 4, are microencapsulated with 45 g ethylcellulose in cyclohexane. The polymer deposition on the sulphur-containing M/F microcapsules is effected by means of a controlled cooling process of the ethylcellulose which is soluble in hot cyclohexane.
Yield, coated microencapsulated sulphur, dry: 310 g
Extractable sulphur: not detectable
Stability after rubber incorporation: 336 h

EXAMPLE 12

50 l water and 7 l of a 2N citric acid are placed in a reactor fitted with corresponding agitation technology and heated to 60° C. 7.5 l melamine resin solution are metered into this diluted citric acid solution. After a precondensation time of 5 min, 10 kg ground sulphur are rapidly introduced with intensive mixing in a turbine agitator.

The microcomposites are separated and encapsulated a second time in an analogous manner with 7.5 l M/F resin solution in the presence of 7 l of a 2N citric acid in 50 l water.

The capsules are separated and tested in the filter-moist state for sulphur release and stability in the rubber mixture (as described in Example 1).

11.5 g of the twice-encapsulated sulphur particles are coated in the filter-moist state with 500 g paraffin wax dissolved in 10 l benzene at 70° C. The coated microcomposites are separated at the coating temperature and air-dried.
Yield, coated microencapsulated sulphur, dry: 12.0 kg
Extractable sulphur: 0.2%
Stability after rubber incorporation: 336 h

EXAMPLE 13

10 kg sulphur are melted analogously to Example 7, microencapsulated twice with M/F resin, furnished with a paraffin wax sliding layer, separated and dried.
Yield, coated microencapsulated sulphur, dry: 12.0 kg
Extractable sulphur: 0.1%
Stability after rubber incorporation: 336 h

EXAMPLE 14

Complex Capsule Wall Comprising a Double Casing and Sliding Layer 100 g microcomposites with postcured M/F resin double wall, produced analogously to Example 4, 5 or 7, are coated with 20 g calcium stearate, dissolved in 0.5 l toluene, at 90° C. The coated microcomposites are separated at the coating temperature and air-dried.
Yield, coated microencapsulated sulphur, air-dried: 106 g
Extractable sulphur: not detectable
Stability after rubber incorporation: 436 h

The invention claimed is:
1. Microcapsules comprising:
    a) a core containing at least one rubber additive,
    b) at least two shells made from an amino resin or phenol formaldehyde resin, wherein the shells together have a thickness between 30 and 100 nm; and,
    c) at least one sliding or wearing layer applied to the surface of the microcapsules selected from the group of polyacrylates, polyacrylonitriles, polyethylene glycols, ethyl celluloses, starch fatty acid esters and starch carbamates of long-chain isocyanates, or from low-molecular inorganic or organic compounds selected from the group of waxes, fatty acid derivatives, silicones, siloxanes and silicates,
    wherein the shells and the sliding or wearing layer together have a thickness between 40 and 200 nm.
2. Microcapsules according to claim 1, wherein the shells are mechanically stable and thermally stable up to at least 120° C.
3. Microcapsules according to claim 1, wherein the rubber additive can be released in a controlled manner under vulcanisation conditions.
4. Microcapsules according to claim 1, wherein the rubber additive is ground or liquid sulphur.
5. Microcapsules according to claim 1, wherein the proportion of sulphur in the microcapsules is more than 50% by weight.
6. Microcapsules according to claim 1, wherein the proportion of sulphur in the microcapsules is between 80 and 95% by weight.
7. Microcapsules according to claim 1, wherein the amino resin is selected from dicyandiamide formaldehyde resin, or melamine formaldehyde resin.
8. Microcapsules according to claim 1, wherein the average particle diameter of the microcapsules is between 1 and 50 µm.
9. Microcapsules according to claim 1, wherein the average particle diameter of the microcapsules is between 5 and 20 µm.
10. Method for producing microcapsules made of a core which contains at least one rubber additive, and at least two shells and at least one sliding or wearing layer as in claim 1 comprising the following steps:
    a) dispersing the rubber additive in a prepolymer solution that forms the first shell;
    b) curing the microcapsules chemically by the addition of a catalyst and/or by increasing the temperature,
    c) depositing the second shell from a prepolymer solution that forms the second shell; and
    d) depositing at least one sliding or wearing layer on the surface of the microcapsules.
11. Method according to claim 10, wherein ground or liquid sulphur is used as rubber additive.
12. Method according to claim 10, wherein a reactive resin selected from the group of melamine formaldehyde resin or phenol formaldehyde resin is used as first polymer that form the shells.
13. Method according to claim 10, wherein after the curing in step b), the microcapsules are separated from the prepolymer solution.
14. Method according to claim 10, wherein the sliding or wearing layer is deposited by means of coacervation, solvent evaporation, salting-out or spray-drying.
15. Method according to claim 10, wherein the sliding or wearing layer is formed from low molecular inorganic or organic compounds deposited from organic solution or aqueous dispersion.

16. Method according to claim 10, wherein the sliding or wearing layer is deposited by spraying processes.

17. Method according to claim 10, wherein the microcapsules, during deposition in step d), are granulated by means of the sliding or wearing layer.

18. Method according to claim 10, wherein the microcapsules, after deposition in step d), are granulated by means of a granulation aid.

19. Method for rubber vulcanisation comprising using the microcapsules according to claim 1.

* * * * *